(12) United States Patent
Wang

(10) Patent No.: US 8,164,249 B2
(45) Date of Patent: Apr. 24, 2012

(54) DISPLAY DEVICE

(75) Inventor: Chih-Yuan Wang, Shengang Township, Taichung County (TW)

(73) Assignee: Wintek Corporation, Taichung (TW)

( * ) Notice: Subject to any disclaimer, the term of this patent is extended or adjusted under 35 U.S.C. 154(b) by 60 days.

(21) Appl. No.: 12/780,058

(22) Filed: May 14, 2010

(65) Prior Publication Data
US 2010/0289402 A1  Nov. 18, 2010

(30) Foreign Application Priority Data
May 15, 2009 (TW) .............................. 98116149 A

(51) Int. Cl.
*H05B 33/00* (2006.01)
*H01J 1/62* (2006.01)
(52) U.S. Cl. ........ 313/498; 313/112; 313/113; 313/506; 313/509

(58) Field of Classification Search ........................ None
See application file for complete search history.

(56) References Cited

U.S. PATENT DOCUMENTS

| | | | |
|---|---|---|---|
| 2005/0088079 A1* | 4/2005 | Daniels | 313/504 |
| 2005/0136210 A1* | 6/2005 | Boettcher | 428/76 |
| 2005/0151463 A1* | 7/2005 | Yamamoto et al. | 313/503 |
| 2010/0277065 A1* | 11/2010 | Park et al. | 313/509 |

* cited by examiner

*Primary Examiner* — Ashok Patel
(74) *Attorney, Agent, or Firm* — Thomas|Kayden

(57) ABSTRACT

A display device including a first substrate, a second substrate opposite to the first substrate, a fiber layer, a first electrode layer and a second electrode layer is provided. The fiber layer is disposed between the first substrate and the second substrate and includes a plurality of fibers and a display medium disposed therein. The first electrode layer is disposed adjacent to the first substrate, and the second electrode layer is disposed adjacent to the second substrate. The display medium is driven by the change of electric field between the first electrode layer and the second electrode layer to be moved in the fibers for displaying a frame.

16 Claims, 3 Drawing Sheets

DISPLAY DEVICE

This application claims the benefit of Taiwan application Ser. No. 98116149, filed May 15, 2009, the subject matter of which is incorporated herein by reference.

BACKGROUND OF THE INVENTION

1. Field of the Invention

The invention relates in general to a display device, and more particularly to a display device with fibers.

2. Description of the Related Art

Electronic ink, having the features of lightweight, thinness, and compactness, is a reflective display without backlight. The use of electronic ink saves the cost of backlight unit, and does not harm the user's eyes even after a long duration of reading. Thus, electronic ink is particularly suitable for reading purpose. Besides, electronic ink is flexible and can be bent over like paper.

As electronic ink is very thin (the thickness is only about 1.2 mm), its strength is poor and its mechanical properties such as resistance to pressure and toughness are yet to be improved. As there is not limit in the development and advance in technology, how to manufacture a thinner and robust display device to bring about more convenience to people's everyday life has become a focus to the manufacturers.

SUMMARY OF THE INVENTION

The invention is directed to a display device including fibers with display medium disposed therein to provide a thinner display device.

An exemplary embodiment of the invention provides a display device, which includes a first substrate, a second substrate, a fiber layer, a first electrode layer and a second electrode layer. The second substrate is opposite to the first substrate. The fiber layer is disposed between the first substrate and the second substrate and includes a plurality of fibers and a display medium wherein the display medium is disposed within the fibers. The first electrode layer is disposed adjacent to the first substrate, and the second electrode layer is disposed adjacent to the second substrate. The display medium is driven by the change of electric field between the first electrode layer and the second electrode layer to be moved in the fibers.

The invention will become apparent from the following detailed description of the preferred but non-limiting embodiments. The following description is made with reference to the accompanying drawings.

DETAILED DESCRIPTION OF THE INVENTION

The display device of the invention includes a fiber layer, wherein the fiber layer includes a plurality of fibers and a display medium disposed therein. The fiber layer is disposed between two electrode layers of the display device, so that the display medium within the fibers is driven by the electric field between two electrode layers for displaying a frame. Two embodiments are exemplified below. However, these embodiments are examples of implementations under the spirit of the invention, and the disclosures and drawings of these embodiments are for exemplification purpose only not for limiting the scope of protection of the invention.

First Embodiment

Figure 1:
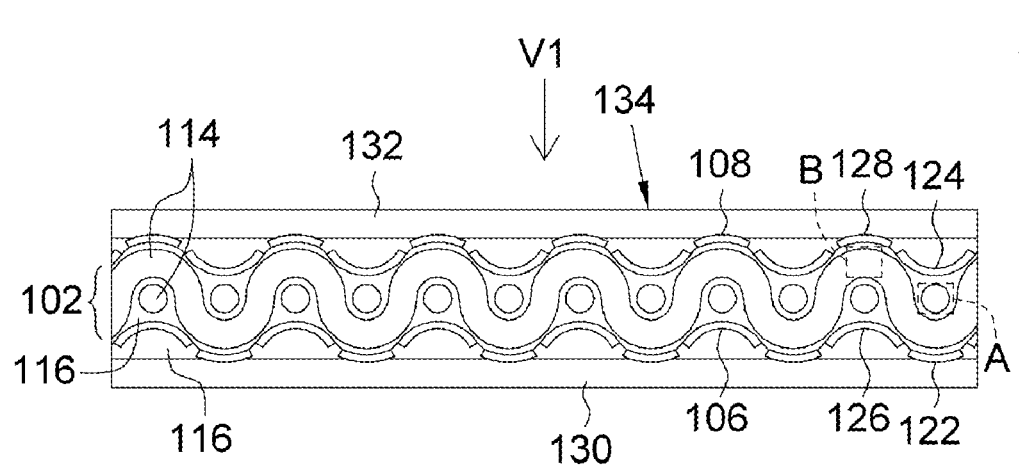
FIG. 1 shows a display device according to a first embodiment of the invention.
Figure 2:
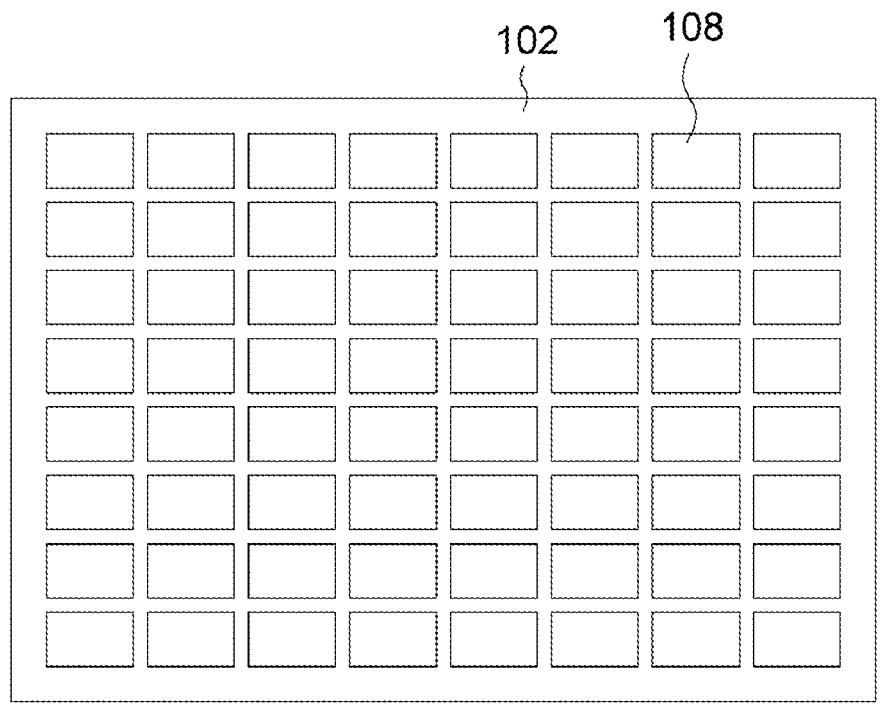
FIG. 2 shows a matrix electrode layer viewed along direction V1 of FIG. 1.
Figure 3:
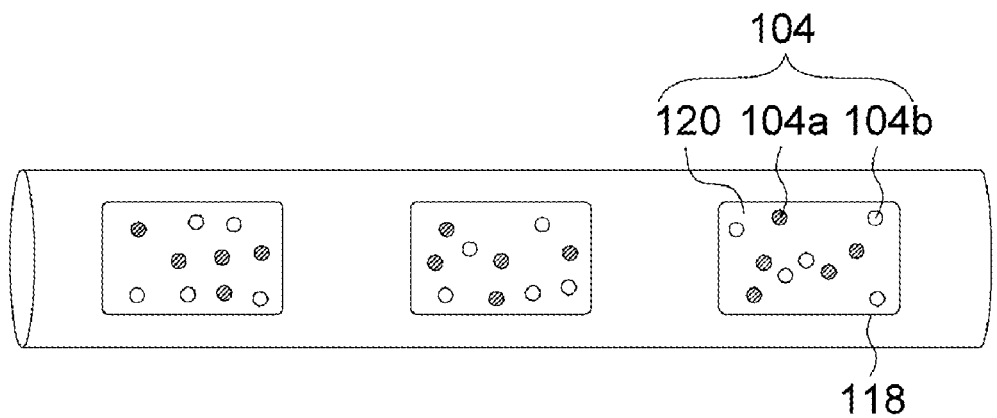
FIG. 3 shows an enlargement of a single fiber of FIG. 1.

Referring to FIG. 1, FIG. 2 and FIG. 3. FIG. 1 shows a display device according to a first embodiment of the invention. FIG. 2 shows a matrix electrode layer viewed along direction V1 of FIG. 1. FIG. 3 shows an enlargement of a single fiber of FIG. 1. As indicated in FIG. 1, the display device 100 includes a fiber layer 102, a first electrode layer 106, a second electrode layer 108, a dielectric layer 116, a first substrate 130, a second substrate 132, a driving module (not illustrated) and a display surface 134. The second substrate 132 is opposite to the first substrate 130. The first substrate 130 and the second substrate 132 are transparent substrates.

The fiber layer 102 is disposed between the first substrate 130 and the second substrate 132 and includes a plurality of fibers 114 and a display medium 104 (illustrated in FIG. 3) and a plurality of capsules 118 (illustrated in FIG. 3), wherein the display medium 104 is disposed within the fibers 114.

The first electrode layer 106 is disposed adjacent to the first substrate 130, and the second electrode layer 108 is disposed adjacent to the second substrate 132. As indicated in FIG. 2, the first electrode layer 106 and the second electrode layer 108 are flexible electrodes having matrix pattern, and can be made from indium tin oxide (ITO). Besides, the first electrode layer 106 and the second electrode layer 108 are disposed between the first substrate 130 and the second substrate 132. The first substrate 130 and the second substrate 132 protect or support the fiber layer 102.

Besides, the dielectric layer 116, made from polymer resin, is at least interposed between the first substrate 130 and the second substrate 132. The dielectric layer 116 binds the fibers 114 together so that the fibers will not move easily so the display device 100 becomes more robust. Also, the dielectric layer 116 fills up the gap within the fibers 114.

As indicated in FIG. 3, each capsule 118 encapsulates the display medium 104 including a fluid 120 and a plurality of dye particles. Examples of the dye particles include a plurality of black particles 104a of negative electricity and a plurality of white particles 104b of positive electricity. The fluid 120 can be a transparent, blackish or whitish ink.

In the present embodiment of the invention, the display medium 104 is encapsulated in the capsules 118. However, the display medium 104 can also be distributed in the fiber 114 without being encapsulated by the capsules 118.

As disclosed above, the display device 100 of the present embodiment of the invention is formed by weaving the fibers 114. The fibers 114, being robust and extremely thin, can be woven to form a display device as thin as hair or silk stocking. Thus, the display device 100 of the present embodiment of the invention is a thin but robust display device.

The fibers 114 can be made from one of the following materials or a combination thereof. Examples of the fiber 114 include cellulose nitrate fiber, visco rayon, cuprammonium rayon, special rayon, man-made protein fiber, casein fiber, groundnut fiber, zein fiber, soy fiber, keratin fiber, regenerated fiber, acetate fiber, triacetate fiber, acetylated fiber, polyamide fiber, nylon, polyamide fiber, polyaramide fiber, polyester, polyacrylonitrile fiber, olefin, polyvinyl alcohol fiber, saran, vinyon, polytetrafluoroethylene fiber, polyvinylidene cyanide fiber, polyurea fiber, polystyrene fiber, polyurethane fiber or spandex.

Besides, the driving module is electrically connected to the first electrode layer 106 and the second electrode layer 108 for generating an electric field between the first electrode layer 106 and the second electrode layer 108. The display medium 104 is driven by the change of electric field between the first electrode layer 106 and the second electrode layer 108 to be moved in the fiber 114 for displaying a frame on the display surface 134 (illustrated in FIG. 1). Furthermore, the first electrode layer 106 and the second electrode layer 108 are patterned as matrix electrode for the driving module to provide different voltage polarity for respective pair of the first electrode layer 106 and the second electrode layer 108 so that different portions of the display surface 134 have different voltage polarities and a frame can be displayed.

Figure 4:
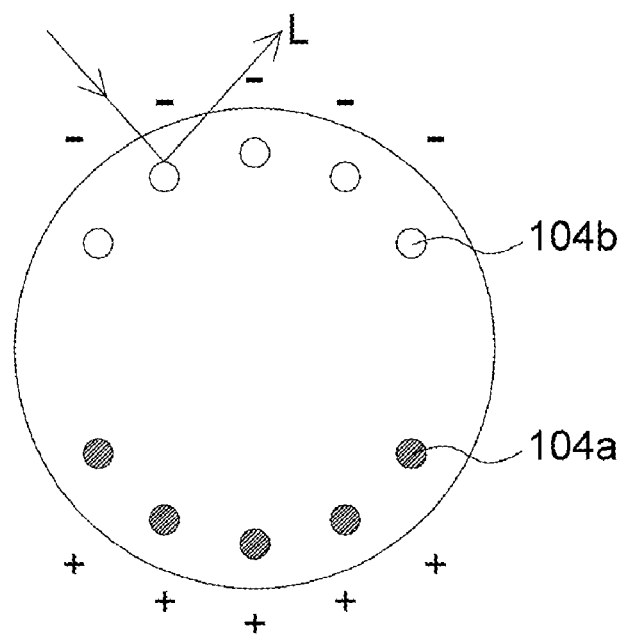
FIG. 4 shows an enlargement of a local area A FIG. 1.

Referring to FIG. 4 and FIG. 1. FIG. 4 shows an enlargement of a partial area A in FIG. 1. The driving module can control the first portion 122 of the first electrode layer 106 of FIG. 1 to carry positive polarity with respect to the first portion 124 of the second electrode layer 108, so that white particles 104b carrying positive electricity are rejected and moved towards the second electrode layer 108 (illustrated in FIG. 1) as indicated in FIG. 4. Thus, the environment light L projected on the white display medium 104b is reflected off the display device 100 to show white color on the display surface 134.

Figure 5:
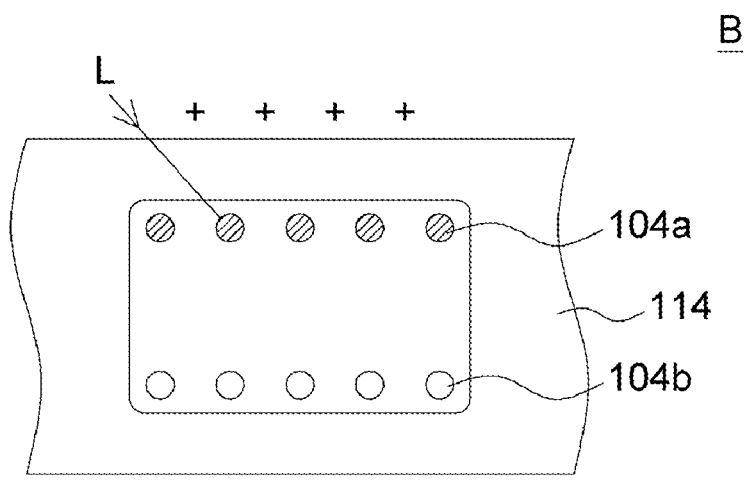
FIG. 5 shows an enlargement of a local area B FIG. 1.

Referring to FIG. 5 and FIG. 1. FIG. 5 shows an enlargement of a partial area B in FIG. 1. The driving module can also control the second portion 126 of the first electrode layer 106 of FIG. 1 to carry negative polarity with respect to the second portion 128 of the second electrode layer 108, so that the black particles 104a carrying negative electricity are attracted and moved towards the second electrode layer 108 (illustrated in FIG. 1). Thus, the environment light L will be absorbed by the black display medium 104a to show black color on the display surface 134. A frame is thus displayed by way of controlling the voltage polarities of other portions between the first electrode layer 106 and the second electrode layer 108 of FIG. 1.

In the present embodiment of the invention, the fluid 120 can be a transparent, blackish or whitish ink. However, in other embodiments, the fluid 120 can be replaced by gas. When the fluid 120 is gas, the display medium 104 confronting a smaller resistance will move faster and the display device will have a faster frame rate accordingly. Or, the display medium 104 can also be a dielectric black fluid and a plurality of white particles carrying positive electricity 104b wherein the dielectric black fluid can absorb the light L to replace the black particles 104a.

Figure 6:
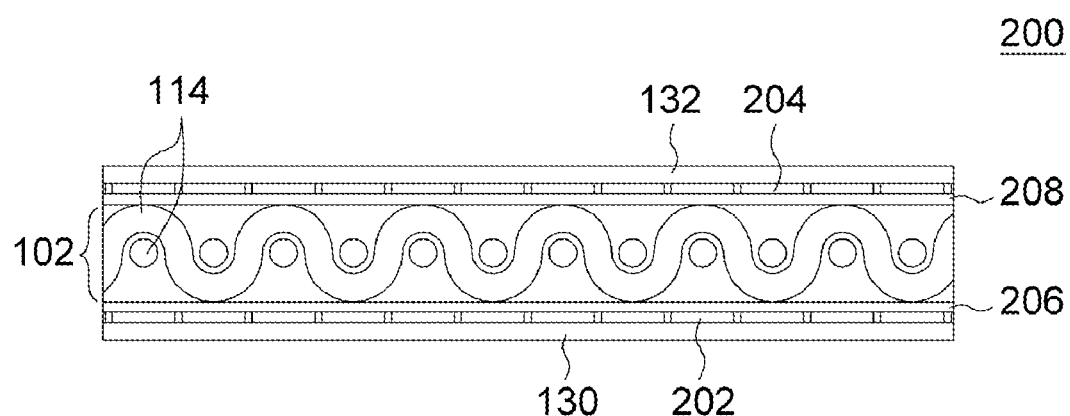
FIG. 6 shows a display device according to another embodiment of the invention.

Besides, Referring to FIG. 6 showing the display device according to another embodiment of the invention. The first electrode layer 202 and the second electrode layer 204 of the display device 200 are not wave like but still patterned as matrix electrode. Besides, the display device 200 controls the display medium 104 in a way similar to the display device 100, so there is no more detailed description herein. As for the similarities between FIG. 6 and FIG. 1, the same designations are used and are not repeated here.

As indicated in FIG. 6, the display device 200 further includes a first adhesion layer 206 and a second adhesion layer 208. The first adhesion layer 206 is disposed between the fiber layer 102 and the first electrode layer 202 for fixing the first electrode layer 202 and the fiber layer 102. The second adhesion layer 208 is disposed between the fiber layer 102 and the second electrode layer 204 for fixing the second electrode layer 204 and the fiber layer 102. That is, the first electrode layer 202 and the second electrode layer 204 are fixed on the fiber layer 102 by way of pasting or adhering. Or, another way of fixing the first electrode layer 202 and the second electrode layer 204 on the fiber layer 102 can be achieved by the technology of electroplating.

Second Embodiment

Figure 7:
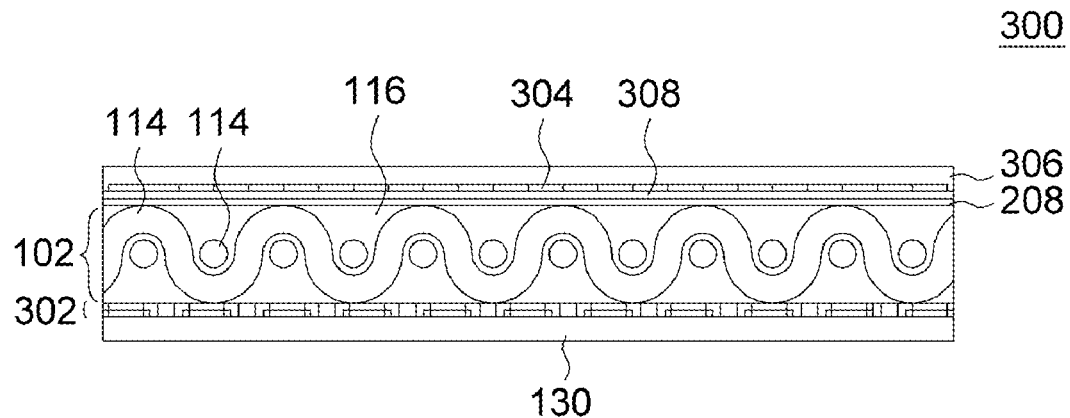
FIG. 7 shows a display device according to a second embodiment of the invention.

Referring to FIG. 7 which shows a display device according to a second embodiment of the invention. As for the similarities between the present embodiment of the invention and the first embodiment, the same designations are used and are not repeated here. The display device 300 of the second embodiment differs with the display device 100 of the first embodiment in that the display device 300 is a color display device.

Furthermore, the display device 300 includes a color filter (color filter) 304, and the first electrode layer of the display device 300 is an active element array structure layer 302, such as thin film transistor (TFT). The color filter 304 is disposed between the fiber layer 102 and the second substrate 306, and the active element array structure layer 302 is disposed between the fiber layer 102 and the first substrate 130.

Moreover, the second electrode layer 308 of the present embodiment of the invention is a common electrode driven by the driving module (not illustrated) of the display device 300 for generating an electric field between the second electrode layer 308 and active element array structure layer 302 for driving the display medium 104 (illustrated in FIG. 3) to change its position for displaying a frame.

The display device 300 of the present embodiment of the invention includes a color filter 304, and is able to display a color frame accordingly. Besides, the display device 300 driven by the active element array structure layer 302 has a faster frame rate, so the display device 300 is smooth in displaying a motion picture.

In the present embodiment of the invention, the display device 300 includes a color filter 304 and an active element array structure layer 302. However, in other embodiments, the display device 300 can includes the color filter 304 without the active element array structure layer 302, or includes the active element array structure layer 302 without the color filter 304.

The fiber layer 102 of the display device disclosed in the first embodiment and the second embodiment is exemplified by a woven fiber layer. However, the fiber layer 102 can also be an unwoven fiber layer, such as a piece of unwoven cloth or a piece of paper. Any fibers in which the display medium 104 can be disposed are the fiber 114 referred in the invention.

The display device disclosed in the above embodiments of the invention has many advantages exemplified below:

(1). The display device of present embodiment of the invention is made from fibers. The fibers, being robust and extremely thin, can be woven to form a display device as thin as hair or silk stocking. Thus, the display device 100 of the present embodiment of the invention is a thin but robust display device.

(2). The fiber layer can be a woven fiber layer, or an unwoven fiber layer such as a piece of unwoven cloth or a piece of paper. Therefore, the display device of the invention can be manufactured in many ways, and has many choices in terms of manufacturing.

(3). When the display device of the invention includes a color filter, the display device is a color display device.

(4). The display device with including an active element array structure layer has a faster frame rate and is very smooth in displaying a motion picture.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reflective display device, comprising:
   a first substrate;
   a second substrate disposed opposite to the first substrate;
   a fiber layer disposed between the first substrate and the second substrate, and comprising:
      a plurality of fibers; and
      a reflective display medium disposed within the fibers;
   a first electrode layer disposed adjacent to the first substrate; and
   a second electrode layer disposed adjacent to the second substrate;
   wherein the display medium is driven by the change of electric field between the first electrode layer and the second electrode layer to be moved within the fibers.

2. The display device according to claim 1, further comprising:
   a dielectric layer at least interposed between the first substrate and the second substrate.

3. The display device according to claim 1, wherein the fiber layer further comprises:
   a plurality of capsules encapsulating the display medium.

4. The display device according to claim 1, wherein the first electrode layer and the second electrode layer are made from indium tin oxide (ITO).

5. The display device according to claim 4, wherein the first substrate and the second substrate are transparent substrate.

6. The display device according to claim 5, wherein the first electrode layer and the second electrode layer are patterned as a matrix electrode.

7. The display device according to claim 1, further comprising:
   a color filter disposed between the fiber layer and the second substrate.

8. The display device according to claim 7, wherein the first electrode layer is an active element array structure layer disposed between the fiber layer and the first substrate.

9. The display device according to claim 8, wherein the second electrode layer is a common electrode disposed between the fiber layer and the second substrate.

10. The display device according to claim 1, further comprising:
    a first adhesion layer disposed between the fiber layer and the first electrode layer for fixing the first electrode layer on the fiber layer.

11. The display device according to claim 1, further comprising:
    a second adhesion layer disposed between the fiber layer and the second electrode layer for fixing the second electrode layer on the fiber layer.

12. The display device according to claim 1, wherein the fiber layer is a woven fiber layer.

13. The display device according to claim 1, wherein the fiber layer is an unwoven fiber layer.

14. The display device according to claim 3, wherein the display medium is a plurality of dye particles carrying electric charges.

15. The display device according to claim 14, wherein the dye particles includes black particles carrying negative electricity and white particles carrying positive electricity.

16. The display device according to claim 3, wherein the display medium is a dielectric black fluid and a plurality of white particles carrying positive electricity.

* * * * *